United States Patent
Ueda

(10) Patent No.: US 8,909,825 B2
(45) Date of Patent: Dec. 9, 2014

(54) SYSTEM FOR DETERMINING A MAXIMUM MULTIPLICITY SET FOR COMMUNICATION LINES BETWEEN A PLURALITY OF DEVICES USING A CALCULATED RATE RECEIVED FROM THE PLURALITY OF DEVICES

(75) Inventor: Akihiro Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 13/571,500

(22) Filed: Aug. 10, 2012

(65) Prior Publication Data

US 2013/0060973 A1   Mar. 7, 2013

(30) Foreign Application Priority Data

Sep. 5, 2011   (JP) ................................ 2011-192992

(51) Int. Cl.
*G06F 13/14*   (2006.01)
(52) U.S. Cl.
USPC .................. 710/33; 710/34; 710/35; 706/226; 711/162; 711/163; 711/164; 711/165; 714/5; 714/6; 714/7
(58) Field of Classification Search
USPC ........... 710/33–35; 711/162–165; 714/5, 6, 7; 709/226
See application file for complete search history.

(56) References Cited

U.S. PATENT DOCUMENTS

| | | | | |
|---|---|---|---|---|
| 7,707,375 B2 * | 4/2010 | Nabekura | ...................... | 711/162 |
| 7,756,978 B2 * | 7/2010 | Nakaminami et al. | ........ | 709/226 |
| 7,761,672 B2 * | 7/2010 | Clark et al. | ................... | 711/162 |
| 8,086,773 B2 * | 12/2011 | Nakajima | ........................ | 710/74 |
| 8,095,755 B2 * | 1/2012 | Ashour et al. | ................. | 711/162 |
| 8,514,859 B2 * | 8/2013 | Uttaro et al. | ................... | 370/389 |
| 2004/0260970 A1 * | 12/2004 | Beardsley et al. | ................. | 714/6 |
| 2005/0216688 A1 | 9/2005 | Watanabe | | |
| 2007/0130432 A1 | 6/2007 | Aigo | | |

FOREIGN PATENT DOCUMENTS

| | | |
|---|---|---|
| JP | 10-198607 | 7/1998 |
| JP | 10-333838 | 12/1998 |
| JP | 2003-256149 | 9/2003 |
| JP | 2005-275537 | 10/2005 |
| JP | 2007-156911 | 6/2007 |
| JP | 2008-108142 | 5/2008 |

* cited by examiner

*Primary Examiner* — Tammara Peyton

(74) *Attorney, Agent, or Firm* — Fujitsu Patent Center

(57) ABSTRACT

A storage device includes a processing state value calculator that calculates a first processing state value representing a state of data forwarding from the storage device via the connection lines; a notifier that notifies the first processing state value to the second storage device; a receiver that receives a second processing state value representing a state of data forwarding from another storage device (second storage device) via the communication lines and calculated in the second storage device; a multiplicity calculator that calculates, using the first processing state value and the second processing state value, a multiplicity representing the number of data forwarding processes which the storage device is able to simultaneously carry out on the communication lines; and a forwarding controller that forwards data via the communication lines within the calculated multiplicity, so that data may be optimally forwarded via the connection lines.

9 Claims, 18 Drawing Sheets

| REMOTE LINE ID | FORWARDING POINT | | | |
|---|---|---|---|---|
| | SELF VALUE | DEVICE ID#00 | DEVICE ID#01 | ... |
| 0x00 | A | B | C | ... |
| 0x01 | A | B | C | ... |
| 0x02 | A | B | C | ... |
| . | . | . | . | ... |
| . | . | . | . | ... |

231

| REMOTE LINE ID | MULTIPLICITY | | |
| --- | --- | --- | --- |
| | MAXIMUM LINE MULTIPLICITY | OPERABLE MULTIPLICITY | THE NUMBER OF OPERATIONS |
| 0x00 | M | X | x |
| 0x01 | N | Y | y |
| 0x02 | O | Z | z |
| . | . | . | . |
| . | . | . | . |

232

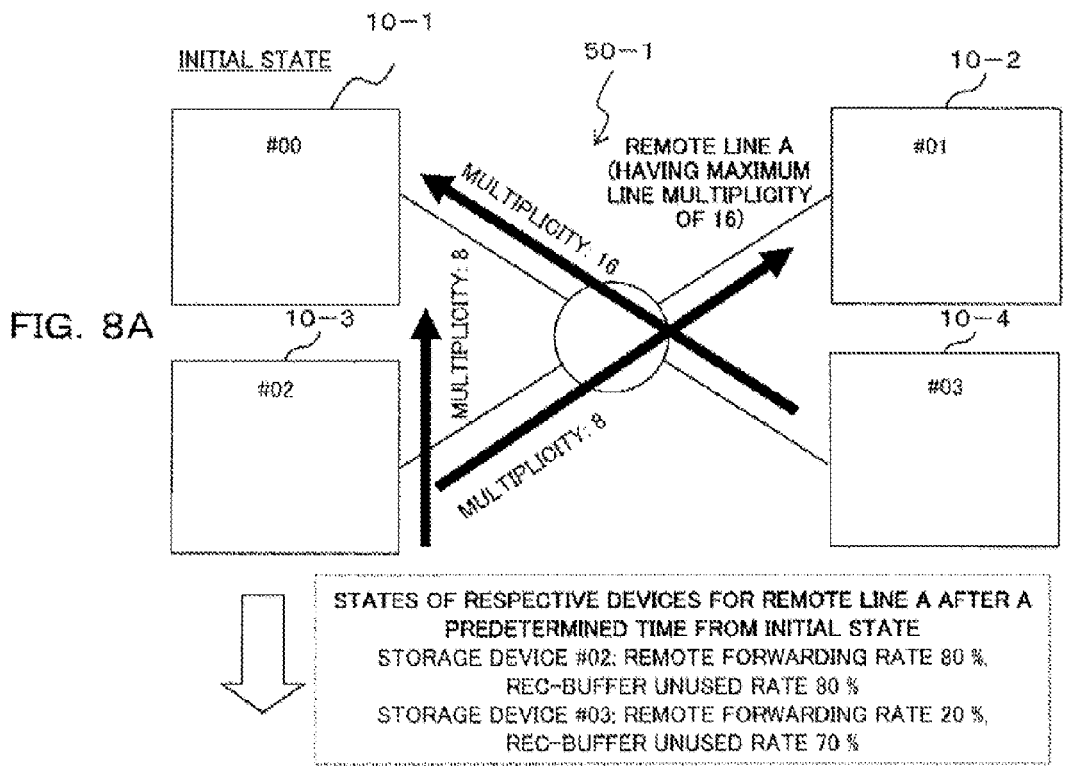
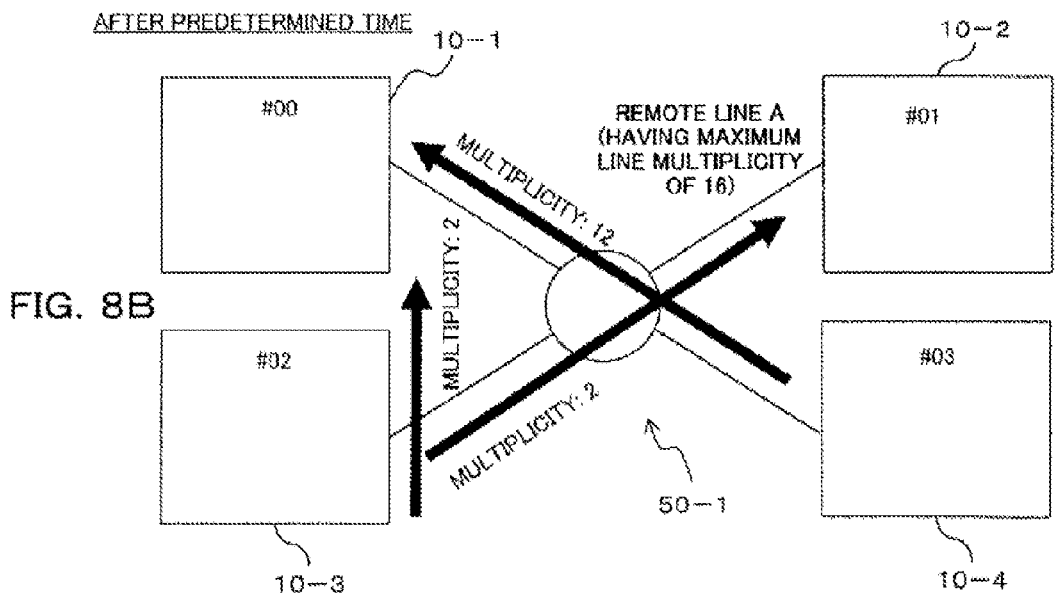

| REMOTE LINE ID | FORWARDING POINT | | | |
|---|---|---|---|---|
| | SELF VALUE ID #00 | DEVICE ID #01 | DEVICE ID #02 | DEVICE ID #03 |
| 0x00 | 0 | 0 | 1 | 3 |

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 16 | 0 | 0 |

| REMOTE LINE ID | FORWARDING POINT | | | |
|---|---|---|---|---|
| | SELF VALUE ID #01 | DEVICE ID #00 | DEVICE ID #02 | DEVICE ID#03 |
| 0x00 | 0 | 0 | 1 | 3 |

FIG. 10B

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 16 | 0 | 0 |

| REMOTE LINE ID | FORWARDING POINT | | | |
|---|---|---|---|---|
| | SELF VALUE ID #02 | DEVICE ID #00 | DEVICE ID #01 | DEVICE ID #03 |
| 0x00 | 1 | 0 | 0 | 3 |

FIG. 11B

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 16 | 4 | VARIABLE |

| REMOTE LINE ID | FORWARDING POINT | | | |
|---|---|---|---|---|
| | SELF VALUE ID #03 | DEVICE ID #00 | DEVICE ID #01 | DEVICE ID #02 |
| 0x00 | 3 | 0 | 0 | 1 |

FIG. 12B

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 16 | 12 | VARIABLE |

232

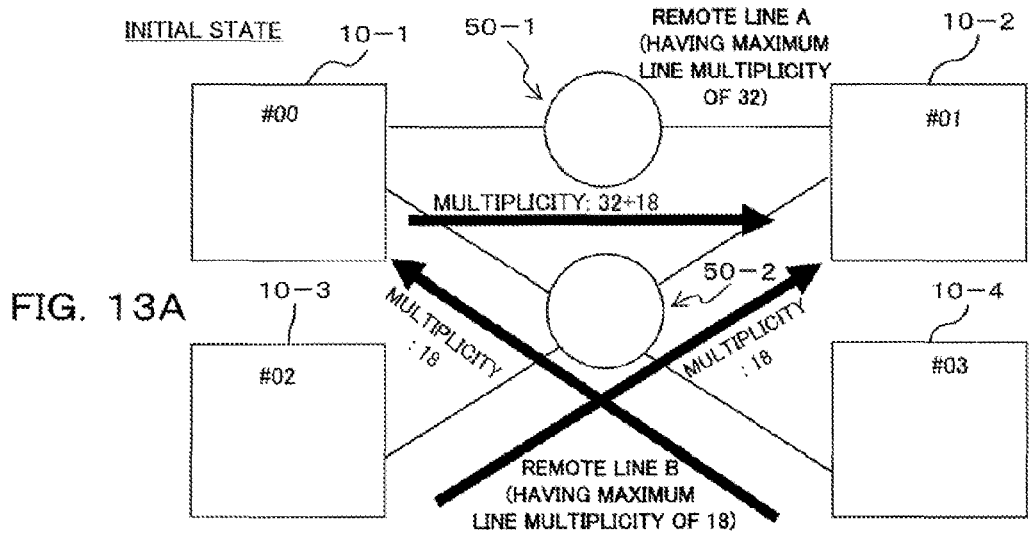

FIG. 13A

STATES OF RESPECTIVE DEVICES FOR REMOTE LINE A AFTER A PREDETERMINED TIME FROM INITIAL STATE
STORAGE DEVICE #00: REMOTE FORWARDING RATE 80 %, REC-BUFFER UNUSED RATE 90 %

STATES OF RESPECTIVE DEVICES FOR REMOTE LINE B AFTER A PREDETERMINED TIME FROM INITIAL STATE
STORAGE DEVICE #00: REMOTE FORWARDING RATE 80 %, REC-BUFFER UNUSED RATE 80 %
STORAGE DEVICE #02: REMOTE FORWARDING RATE 50 %, REC-BUFFER UNUSED RATE 40 %
STORAGE DEVICE #03: REMOTE FORWARDING RATE 10 %, REC-BUFFER UNUSED RATE 10 %

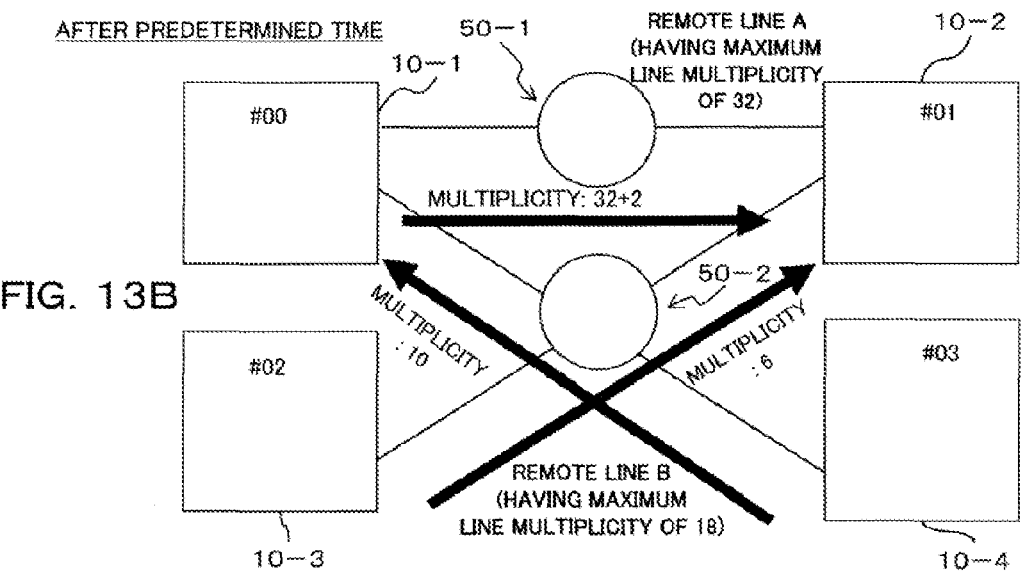

| REMOTE LINE ID | FORWARDING POINT | | | |
|---|---|---|---|---|
| | SELF VALUE ID #00 | DEVICE ID #01 | DEVICE ID #02 | DEVICE ID #03 |
| 0x00 | 1 | 0 | 0 | 0 |
| 0x01 | 1 | 0 | 3 | 5 |

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 32 | 32 | VARIABLE |
| 0x01 | 18 | 2 | VARIABLE |

| REMOTE LINE ID | FORWARDING POINT | | | |
|---|---|---|---|---|
| | SELF VALUE ID #01 | DEVICE ID #00 | DEVICE ID #02 | DEVICE ID#03 |
| 0x00 | 0 | 1 | 0 | 0 |
| 0x01 | 0 | 1 | 3 | 5 |

FIG. 15B

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 32 | 0 | 0 |
| 0x01 | 18 | 0 | 0 |

| REMOTE LINE ID | FORWARDING POINT | | | |
|---|---|---|---|---|
| | SELF VALUE ID #02 | DEVICE ID #00 | DEVICE ID #01 | DEVICE ID #03 |
| 0x00 | 0 | 1 | 0 | 0 |
| 0x01 | 3 | 1 | 0 | 5 |

FIG. 16B

| REMOTE LINE ID | MULTIPLICITY | | |
|---|---|---|---|
| | MAXIMUM LINE MULTIPLICITY | OPERABLE MULTIPLICITY | THE NUMBER OF OPERATIONS |
| 0x00 | 32 | 0 | 0 |
| 0x01 | 18 | 6 | VARIABLE |

232

SYSTEM FOR DETERMINING A MAXIMUM MULTIPLICITY SET FOR COMMUNICATION LINES BETWEEN A PLURALITY OF DEVICES USING A CALCULATED RATE RECEIVED FROM THE PLURALITY OF DEVICES

CROSS-REFERENCE TO RELATED APPLICATIONS

This application is based upon and claims the benefit of priority of the prior Japanese Patent Application No. 2011-192992, filed on Sep. 5, 2011, the entire contents of which are incorporated herein by reference.

FIELD

The embodiment discussed herein is directed to a storage device, a method for data forwarding, and a computer-readable recording medium storing therein a program of data forwarding.

BACKGROUND

The Remote Equivalent Copy (REC) function is known as one of methods of backing up of data of a storage device in a storage system including multiple storage devices.

The REC function copies data of one device into another remote device, and more specifically forwards and copies data in the logical unit of a storage device into the logical unit of another storage unit. Upon completion of the copying, the logical unit of the destination device is kept to be equivalent to that of the source device. In other words, updating of data in the logical unit of the source device is reflected in the logical unit of the destination device, so that data in the both logical units are kept to be equivalent.

The scheduling of data forwarding under the REC function is accomplished by a controller of the source storage device. The scheduling carries out each forwarding process on data of a predetermined data size (e.g., 256 KB) at a multiplicity representing the number of data forwarding processes that may be simultaneously carried out.

For each of the remote lines that connect storage devices, a maximum line multiplicity is set to be the upper limit of the umber of data forwarding processes that the remote line may optimally handle on the basis of the data (e.g., the performance line speed, the line response delay time) of the remote line.

Each storage device carries out data forwarding within the maximum line multiplicity. If a number of copy sessions are present, the copy sessions are scheduled to be evenly performed among the storage devices.

[Patent Literature 1] Japanese Laid-Open Patent Publication No. 2005-275537

However, a conventional method for remote copying using the REC function has a problem of: if multiple storage devices are connected to a single remote line, each storage device not grasping the multiplicities of data forwarding processes by the other storage devices. Accordingly, a remote line may be scheduled to carry out copy sessions beyond the maximum line multiplicity.

Accompanying drawing FIG. 18 is a diagram illustrating remote copying in a conventional storage system. In the example of FIG. 18, a number (four in the example of FIG. 18) of storage devices 300-0 through 300-3 are connected to a remote line 310. The maximum line multiplicity of the remote line 310 is assumed to be 16.

In the conventional storage system of FIG. 18, the storage device 300-2 carries out data forwarding to storage devices 300-0 and 300-1 both at multiplicity of 8, considering the maximum line multiplicity of 16 set for the remote line 310. Concurrently, the storage device 300-3 carries out data forwarding to the storage device 300-0 at a multiplicity of 16.

Consequently, copy sessions are scheduled at a multiplicity of 32 for the remote line 310, which is set to have a maximum line multiplicity of 16, so that the remote line 310 is overloaded. In other words, copy sessions are not properly scheduled for the remote line 310.

SUMMARY

With the above problems in view, according to a first aspect, a storage device connected to a second storage device via one or more connection lines, the storage device including: a processing state value calculator that calculates a first processing state value representing a state of data forwarding from the storage device via the connection lines; a notifier that notifies the first processing state value to the second storage device; a receiver that receives a second processing state value representing a state of data forwarding from the second storage device via the communication lines and calculated in the second storage device; a multiplicity calculator that calculates, using the first processing state value and the second processing state value, a multiplicity representing the number of data forwarding processes which the storage device is able to simultaneously carry out on the communication lines; and a forwarding controller that forwards data via the communication lines within the calculated multiplicity.

According to a second aspect, a method for forwarding data from a first storage device to a second storage device in a storage system comprising a plurality of storage devices, including the first storage device and the second storage device and being connected via one or more communication lines, the method including: calculating a first processing state value representing a state of data forwarding from the first storage device via the connection lines; notifying the first processing state value to the remaining storage devices in the storage system; receiving second processing state values representing respective states of data forwarding from the remaining storing devices and calculated in the remaining storing devices; calculating, using the first processing state value and the second processing state values, a multiplicity representing the number of data forwarding processes that the first storage device is able to simultaneously carry out on the communication lines; and forwarding data via the communication lines within the calculated multiplicity.

According to a third aspect, a computer-readable recording medium having stored therein a program for causing an information processor, being connected to a second information processor via one or more communication lines, to execute a process of forwarding data to the second information processor, the process including: calculating a first processing state value representing a state of data forwarding from the information processor via the connection lines; notifying the first processing state value to the second information processor; receiving a second processing state value representing a state of data forwarding from the second information processor and calculated in the second information processor; calculating, using the first processing state value and the second processing state value, a multiplicity representing the number of data forwarding processes that the information processor is able to simultaneously carry out on the communication lines; and forwarding data via the communication lines within the calculated multiplicity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B are diagrams illustrating change in a data forwarding state in a storage system of the first embodiment;

FIG. 10A is a diagram depicting an example of an IO monitoring table, and FIG. 10B is an example of a diagram depicting a multiplicity table;

FIG. 11A is a diagram depicting an example of an IO monitoring table, and FIG. 11B is an example of a diagram depicting a multiplicity table;

FIG. 12A is a diagram depicting an example of an IO monitoring table, and FIG. 12B is an example of a diagram depicting a multiplicity table;

FIGS. 13A and 13B are diagrams illustrating change in a data forwarding state in a storage system 1 of the first embodiment;

FIG. 14A is a diagram depicting an example of an IO monitoring table, and FIG. 14B is an example of a diagram depicting a multiplicity table;

FIG. 15A is a diagram depicting an example of an IO monitoring table, and FIG. 15B is an example of a diagram depicting a multiplicity table;

FIG. 16A is a diagram depicting an example of an IO monitoring table, and FIG. 16B is an example of a diagram depicting a multiplicity table;

DESCRIPTION OF EMBODIMENT

Hereinafter, an embodiment of the present invention will now be described with reference to the accompanying drawings. However, it should be noted that the following embodiment is an example, and there is no intention to exclude modifications and application of techniques that are not mentioned in the following embodiment and a modification thereof. In other words, the following embodiment and modification may be changed or modified without departing from the concept of the present invention.

Figure 1:
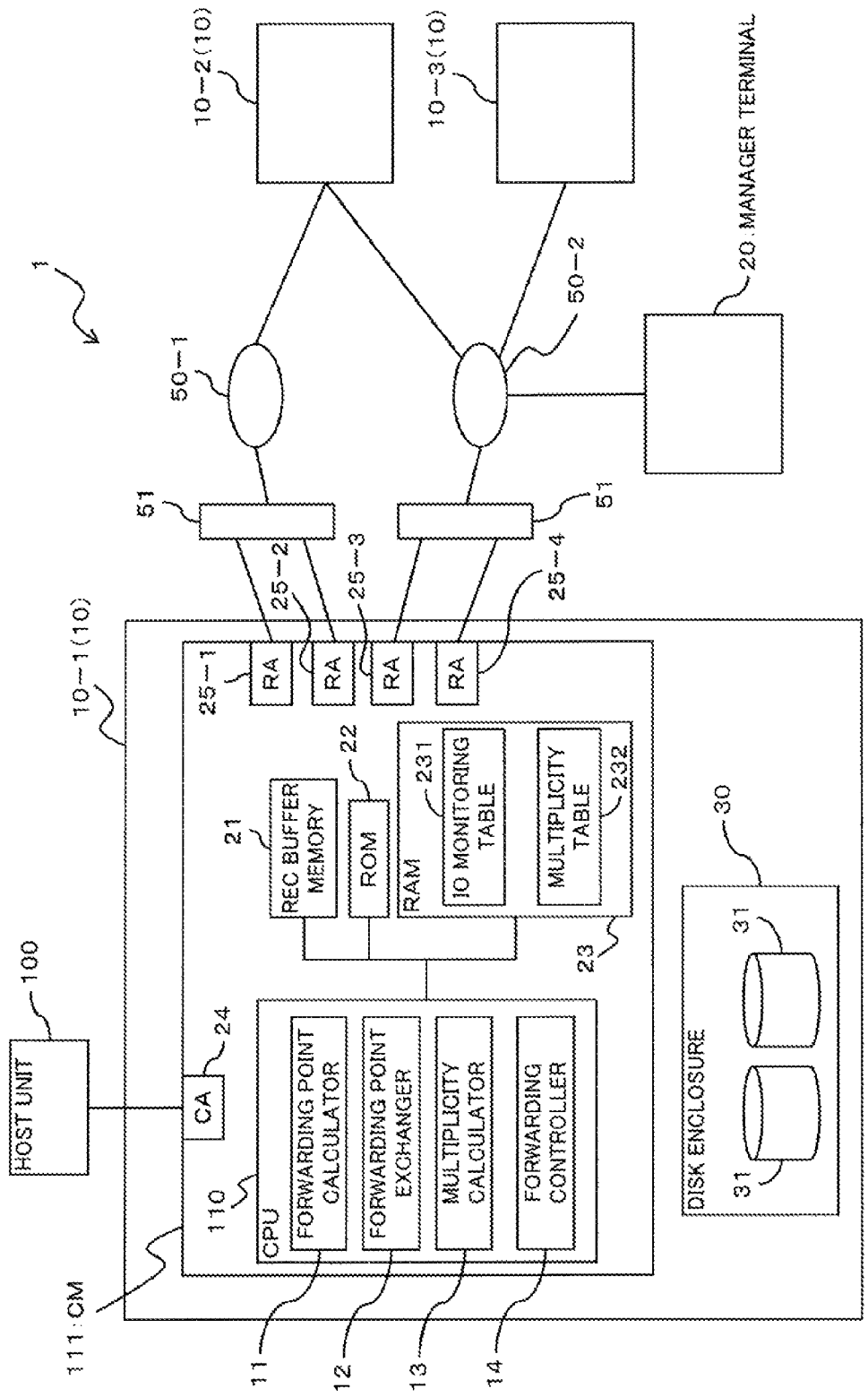
FIG. 1 is a diagram schematically depicting an example of the configuration of a storage system according to a first embodiment.

FIG. 1 is a diagram schematically illustrating an example of the configuration of a storage system 1 according to a first embodiment.

As illustrated in FIG. 1, the storage system 1 serving as one example in the first embodiment includes a number (three in the example of FIG. 1) of storage devices (information processors) 10-1 through 10-3 and a manager terminal 20, which are communicably connected to one another via one or more (two in the example of FIG. 1) remote line (communication lines) 50-1 and 50-2.

In the example of FIG. 1, the storage devices 10-1 and 10-2 are connected to the remote line 50-1; and the storage devices 10-1, 10-2, and 10-3 and the manager terminal 20 are connected to the remote line 50-2.

In other words, the remote line 50-1 is shared by the storage devices 10-1 and 10-2; and the remote line 50-2 is shared by the storage devices 10-1, 10-2, and 10-3.

The storage devices 10-1, 10-2, and 10-3 are the same or substantially the same in functional configuration and hardware configuration. Hereinafter, a storage device discriminated from the remaining storage devices is represented by the reference number 10-1, 10-2, or 10-3, but an unspecified storage device is represented by the reference number 10.

In the example of FIG. 1, the configurations of the storage devices 10-2 and 10-3 are omitted for convenience, and the configuration of only the storage device 10-1 is illustrated.

The remote lines 50-1 and 50-2 conform to the standard such as TCP/IP. Hereinafter, a remote line discriminated from the remaining line is represented by the reference number 50-1 or 50-2, but an unspecified remote line is represented by the reference number 50.

For each remote line 50, a maximum line multiplicity is set in advance which represents the maximum number of data forwarding jobs (copy sessions) that the remote line 50 can simultaneously deal in parallel, ensuring the reliability of the data forwarding.

The maximum line multiplicity of each remote line 50 is set depending on, for example, the configuration, the performance, and the specification of the hardware constituting the remote line 50 when the storage system is designed. The maximum line multiplicities are stored in a multiplicity table 232 that is to be detailed below.

The storage system 1 has the REC function that backs up data in a storage device 10 into another storage device 10. The REC function is achieved by a CPU 110 included in each storage device 10, as detailed below.

For example, data stored in the logical volume (i.e., source volume) set in the storage device 10-1 is transferred in units of a predetermined data size (e.g., 256 KB) using the REC function to the logical volume (i.e., backup volume), so that the data in the storage device 10-1 is copied to the logical volume of the storage device 10-2. Thereby, the source volume and the backup volume are maintained in an equivalent state. Hereinafter, copying data from a source volume to a backup volume is sometimes referred to as a "copy session".

The REC function forwards data from a source volume to a backup volume asynchronously to data writing from the host unit 100 to the source volume, so that a copy session may be accomplished without affecting performance in the data writing performance to the source volume.

The manager terminal 20 sets the REC function for the storage system 1, and is exemplified by a computer including a Central Processing Unit (CPU), a Random Access Memory (RAM), a Read Only Memory (ROM), and others. The manager terminal 20 creates session data of copy sessions to exert the REC function.

The session data is information related to copy sessions. For example, the session data associates a source volume with a backup volume to be used under the REC function, and also associates data forwarding of each copy session with a remote line ID that identifies a remote line 50 to be used for the data forwarding. The session data may be created in any known method, and the detailed description thereof is omitted here.

The session data created by the manager terminal 20 is sent to all the storage devices 10, which store therein the received session data.

Hereinafter, a storage device 10 including a source volume of the REC function is sometimes referred to as a source storage device 10, and a storage device 10 including a backup volume in the REC function is sometimes referred to as a destination storage device 10.

The manager terminal 20 manages also data of the configuration of the storage system 1. The manager terminal 20 sends data of the storage devices 10 connected to each remote line 50, that is data of a sharing state of each remote line 50, to all the storage devices 10, the data being regarded as the system configuration data.

The storage devices 10 provide memory regions to the host unit 100, and are exemplified by Redundant Arrays of Inexpensive Disks (RAID). In FIG. 1, only the storage device 10-1 is connected to the host unit 100 for convenience, but the remaining storage devices 10 may be also connected to the host unit 100.

As illustrated in FIG. 1, each storage device 10 includes a Controller Module (information processor) 111 and a disk enclosure 30. The CM 111 carries out various controls in the storage device 10, such as access to a Hard Disk Drive 31 of the disk enclosure 30 in response to a storage access request (an access control signal) from the superior device, i.e., the host unit 100.

The disk enclosure 30 includes one or more HDDs 31. The memory regions of the HDDs 31 are assigned to the logical volume of the corresponding storage device 10.

As illustrated in FIG. 1, the CM 111 includes a Channel Adapter (CA) 24, Remote Adapters 25-1 through 25-4, the CPU 110, a REC buffer memory 21, the ROM 22, and the RAM 23.

The CA 24 is an interface controller that communicably connects the storage device 10 to the host unit 100, and is exemplified by a fibre channel adapter.

The RAs 25-1 through 25-4 are interface controllers that communicably connect the storage device 10 to other storage devices, and are exemplified by fibre channel adaptors. In the example of FIG. 1, the RAs 25-1 and 25-2 are connected to the remote line 50-1 via the Fibre Channel over IP (FCIP) convertor 51, and the RAs 25-2 and 25-3 are connected to the remote line 50-2 via another convertor 51.

The RAs 25-1 through 25-4 are the same in functional configuration and hardware configuration. Hereinafter, an RA discriminated from the remaining RAs is represented by the reference number 25-1, 25-2, 25-3, or 25-4, but an unspecified RA is represented by the reference number 25.

Each FCIP convertor 51 conforms to the FCIP, and connects devices of the fibre channel protocol to an IP network.

Similarly to the storage device 10-1, the storage devices 10-2 and 10-3 are connected to the remote lines 50-1 and 50-2 via the FCIP convertors 51. For the convenience, FIG. 1 omits illustration of the FCIP convertors 51 connected to the storage devices 10-2 and 10-3.

The REC buffer memory 21 temporarily stores data to be transmitted to another storage device 10. Namely, the REC buffer memory 21 serves as a forwarding data buffer that temporarily stores data to be forwarded to another storage device 10 when the storage device 10 is exerting the REC function.

The CM 111 includes a non-illustrated buffer memory that temporarily stores data received from the host unit 100 and data to be transmitted to the host unit 100.

The ROM 22 serves as a memory that stores programs that the CPU executes and various data pieces. The RAM 23 is a memory region that temporarily stores programs and various data pieces. Specifically, the CPU 110 temporarily stores and expands data and programs into the RAM 23 when executing the program. The RAM 23 also stores an IO monitoring table 231 and a multiplicity table 232 that are to be detailed below. The RAM 23 additionally stores session data and system configuration data transmitted from the manager terminal 20.

The CPU 110 is a processor that carries out various controls and calculations, and exerts various functions by executing programs stored in the ROM 22. As illustrated in FIG. 1, the CPU 110 functions as the forwarding point calculator (processing state value calculator) 11, a forwarding point exchanger (notifier, receiver) 12, a multiplicity calculator 13, and a forwarding controller 14.

A program to function as the forwarding point calculator 11, the forwarding point exchanger 12, the multiplicity calculator 13, and the forwarding controller 14 is provided in the form of being stored in a computer-readable recording medium such as a flexible disk, a CD (e.g., (CD-ROM, CD-R, and CD-RW, etc), a DVD (DVD-ROM, DVD-RAM, DVD-R, DVD+R, DVD-RW, DVD+RW, and HD DVD, etc), a Blu-ray disk, a magnetic disk, an optical disk, and a magneto-optical disk. The computer reads the program from the recording medium and stores the program into an internal or external memory for future use. The program may be stored in a storage device (recording medium), for example, a magnetic disk, an optical disk, and a magneto-optical disk, and may be provided to a computer from the storage device through a communication route.

The functions of the forwarding point calculator 11, the forwarding point exchanger 12, the multiplicity calculator 13, and the forwarding controller 14 are achieved by a microprocessor (corresponding to the CPU 110 of the first embodiment) executing a program stored in an internal memory (corresponding to the RAM 23 or the ROM 22 in the first embodiment). Alternatively, a computer may read a program stored in a recording medium and executes the read program.

Here, a computer is a concept of a combination of hardware and an Operating System (OS), and means hardware which operates under control of the OS. Otherwise, if a program operates hardware independently of an OS, the hardware corresponds to the computer. Hardware includes at least a microprocessor such as a CPU and means to read a computer program recorded in a recording medium. In the first embodiment, the CM 111 serves to function as a computer.

Hereinafter, a storage device 10 having the CPU 110 functioning as these elements 11-14 are also called the device 10.

The forwarding point calculator 11 calculates a forwarding point (i.e., a processing state value) that represents a state of data forwarding from the device 10 via the remote lines 50. The forwarding point calculator 11 calculates a forwarding point when the device 10 is functioning as a source storage device 10.

In the first embodiment, a low forwarding point means that the storage device 10 is in a preferable state of data forwarding; and a high forwarding state means that the storage device 10 is not in a preferable state of data forwarding.

The forwarding point calculator 11 periodically calculates a remote forwarding rate and an REC-buffer unused rate for each remote line 50, and calculates a forwarding point on the basis of these calculated values. A remote forwarding rate is calculated by following expression (1).

Remote forwarding rate (%)=[total amount of remote forwarding for a predetermined time]/[total amount of host writing for the predetermined time]×100 (1)

Here, the total amount of host writing for the predetermined time represents a total amount of forwarded data (writing data) that the host unit 100 writes into a storage device 10 having the source volume during a predetermined time. The total amount of remote forwarding for a predetermined time represents a total amount of forwarded data from the same storage device 10 having the source volume to a storage device 10 having the backup volume through the remote line 50 in question during the predetermined time under the REC function.

The forwarding point calculator 11 compares the calculated remote forwarding rate with one or more prescribed thresholds, and if judging that the remote forwarding rate is one of the thresholds or less, adds one to the forwarding point.

For example, a first threshold (e.g., 60%) and a second threshold (e.g., 30%) are prescribed, and if the remote forwarding rate is the first threshold or less, the forwarding point calculator 11 adds one to the forwarding point. Furthermore, if the remote forwarding rate is second threshold, which is smaller than the first threshold, or less, the forwarding point calculator 11 additionally adds one to the forwarding point. An REC-buffer unused rate is calculated by following expression (2).

REC-buffer unused rate (%)=[REC buffer unoccupied size]/[REC buffer size]×100 (2)

Here, the REC buffer size represents the total capacity of the REC buffer memory 21 included in the storage device 10 having a source volume; and the REC buffer unoccupied size represents an occupied capacity of the REC buffer memory 21. Namely, an REC-buffer unused rate is a percentage representing a ratio of an unoccupied capacity to the total capacity of the REC buffer memory 21.

The forwarding point calculator 11 compares the calculated REC-buffer unused rate with one or more prescribed thresholds, and if judging that the remote forwarding rate is one of the thresholds or less, adds one to the forwarding point.

For example, a first threshold (e.g., 60%) and a second threshold (e.g., 30%) are prescribed, and if the REC-buffer unused rate is the first threshold or less, the forwarding point calculator 11 adds one to the forwarding point. Furthermore, if the REC-buffer unused rate is second threshold, which is smaller than the first threshold, or less, the forwarding point calculator 11 additionally adds one to the forwarding point.

The calculated forwarding point is stored into the IO monitoring table 231 of the RAM 23.

Figure 2:
FIG. 2 is a diagram denoting an IO monitoring table in a storage system of the first embodiment.

FIG. 2 is a diagram illustrating an example of the IO monitoring table 231 of the storage system 1 of the first embodiment.

The IO monitoring table 231 associates the forwarding point calculated for each remote line 50 with the remote line 50 and is provided for each storage device 10. As illustrated in FIG. 2, the IO monitoring table 231 associates each remote line ID with forwarding points calculated in the respective storage devices 10. Here, a remote line ID is identification data of each remote line 50. The forwarding points for each remote line ID stored in the IO monitoring table 231 is one calculated by the forwarding point calculator 11 of the device 10 and ones calculated in other storage devices 10 included in the storage system 1. The forwarding point calculated in each storage device 10 is stored in association with the device ID that identifies the storage device 10.

The forwarding point exchanger (the notifier, the receiver) 12 exchanges the forwarding points between the device 10 and another storage device 10. Namely, the forwarding point exchanger 12 notifies the forwarding point calculated by the forwarding point calculator 11 of the device 10 to another storage device 10, and also receives, from the other storage device, a forwarding point calculated in the other storage device 10.

The forwarding point exchanger 12 stores the forwarding point received from another storage device 10 into the IO monitoring table 231 in association with the device ID of the storage device 10 that notifies the received forwarding point.

The multiplicity calculator 13 calculates an operable multiplicity (i.e., multiplicity) representing the number of data forwarding processes which the device 10 is able to simultaneously carry out via the remote line 50 on the basis of the forwarding point calculated by the forwarding point calculator 11 and the forwarding points notified from other storage devices 10. The operable multiplicity represents a multiplicity the device 10 may preferentially use data for forwarding through the remote line 50.

The multiplicity calculator 13 calculates an operable multiplicity of the device 10 itself by sharing the maximum multiplicity set for the remote line 50 among multiple storage devices 10 that share the remote line 50 according to the forwarding points of the respective storage devices 10.

Specifically, the multiplicity calculator 13 calculates a ratio of multiplicity that the storage device 10 may occupy to the maximum multiplicity set for the remote line 50 by following expression (3).

ratio=[forwarding point of the device]/[total forwarding point of all the storage devices] (3)

Namely, the multiplicity calculator 13 calculates a ratio of the forwarding point of the device 10 to the total forwarding point of all the storage devices 10 that are connected to the remote line 50 to share the remote line 50.

As represented by expression (4), the multiplicity calculator 13 multiplies the ratio calculated by above expression (3) and the maximum line multiplicity set for the remote line 50, so that the operable multiplicity representing the multiplicity allocated to the device 10 may be calculated.

operable multiplicity=[maximum line multiplicity]×ratio (4)

The multiplicity calculator 13 stores the calculated operable multiplicity of the device 10 into the multiplicity table 232 in the RAM 23.

Figure 3:
FIG. 3 is a diagram denoting a multiplicity table in a storage system of the first embodiment.

FIG. 3 is a diagram illustrating an example of the multiplicity table 232 of the storage system 1 of the first embodiment.

The multiplicity table 232 associates each remote line 50 with data about the multiplicity of the device 10, and is provided for each storage device 10. As denoted in FIG. 3, the multiplicity table 232 associates the maximum line multiplicity, the operable multiplicity, and the number of operations are associated with each remote line ID. These data pieces stored in the 232 are registered and managed by, for example, the multiplicity calculator 13.

Here, the number of operations represents the number of processes of forwarding data having a predetermined data size simultaneously carried out under the REC function, and specifically is the number of data forwarding processes being currently carried out, which is registered and updated by, for example, the forwarding controller 14.

In the CM 111, the forwarding point calculator 11, the forwarding point exchanger 12, and the multiplicity calculator 13 carry out the above IO monitoring of the storage system 1, and the results of the IO monitoring are stored in the IO monitoring table 231 and the multiplicity table 232.

The forwarding controller 14 forwards data in the source volume from the device 10 to the destination storage device 10 via the remote line 50 by carrying out a number of data forwarding processes on data pieces having a predetermined data size. The forwarding controller 14 carries out the data forwarding processes in parallel to each other (i.e., multiplexly) within the operable multiplicity calculated by the multiplicity calculator 13.

Specifically, the forwarding controller 14 refers to and compares the number of operations and the operable multiplicity in the multiplicity table 232, and thereby determines the number of operations on the remote line 50 reaches the operable multiplicity. If the number of operations does not reach the operable multiplicity, the forwarding controller 14 starts data forwarding of the copy session. Conversely, if the number of operations reaches the operable multiplicity, the forwarding controller 14 suspends data forwarding of the copy session until the number of operations comes below the operable multiplicity.

In addition, the forwarding controller 14 updates the number of operations stored in the multiplicity table 232. Namely, the forwarding controller 14 increases the number of operations in the multiplicity table 232 each time a data forwarding process starts (increment); and decreases the number of operations in the multiplicity table 232 (decrement) each time a data forwarding process finishes.

Namely, the forwarding controller 14 carries out data forwarding scheduling under the REC function on the basis of results of the above IO monitoring by the forwarding point calculator 11, the forwarding point exchanger 12, and the multiplicity calculator 13.

Figure 4:
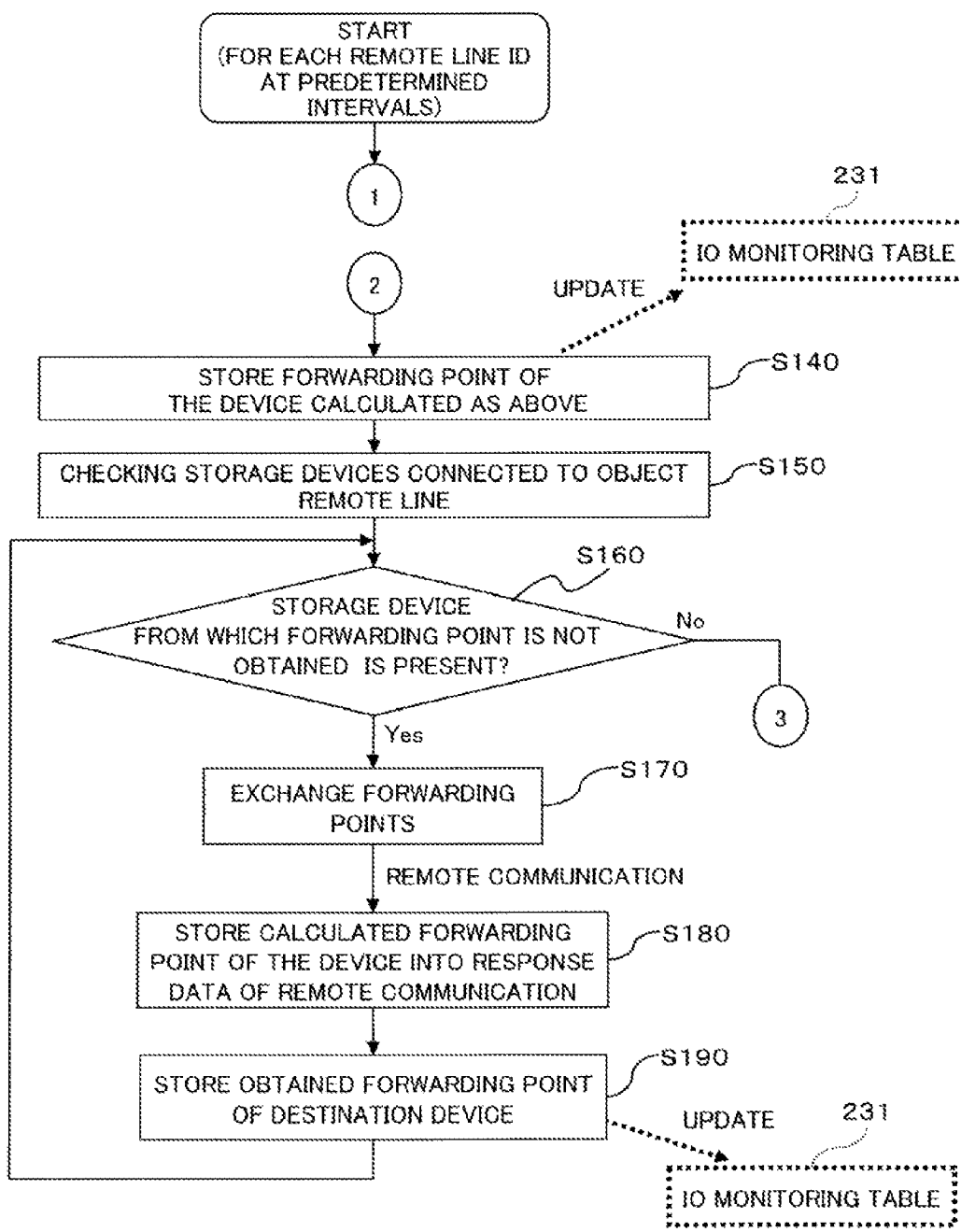
FIGS. 4-6 are flow diagrams denoting a succession of procedural steps of IO monitoring in a storage system of the first embodiment.

An example of the IO monitoring in the storage system 1 of the first embodiment will now be detailed with reference to flow diagram (steps S10 through S210) of FIGS. 4-6. The encircled numbers in FIGS. 4-6 represent processes that will be performed next.

The IO monitoring to be explained below is carried out for each remote line 50 and is repeated for a predetermined time (e.g., every 10 seconds). For example, IO monitoring starts each time a non-illustrated timer or other means in a storage device 10 (e.g., the storage device 10-1) detects that a predetermined time elapses.

Figure 5:
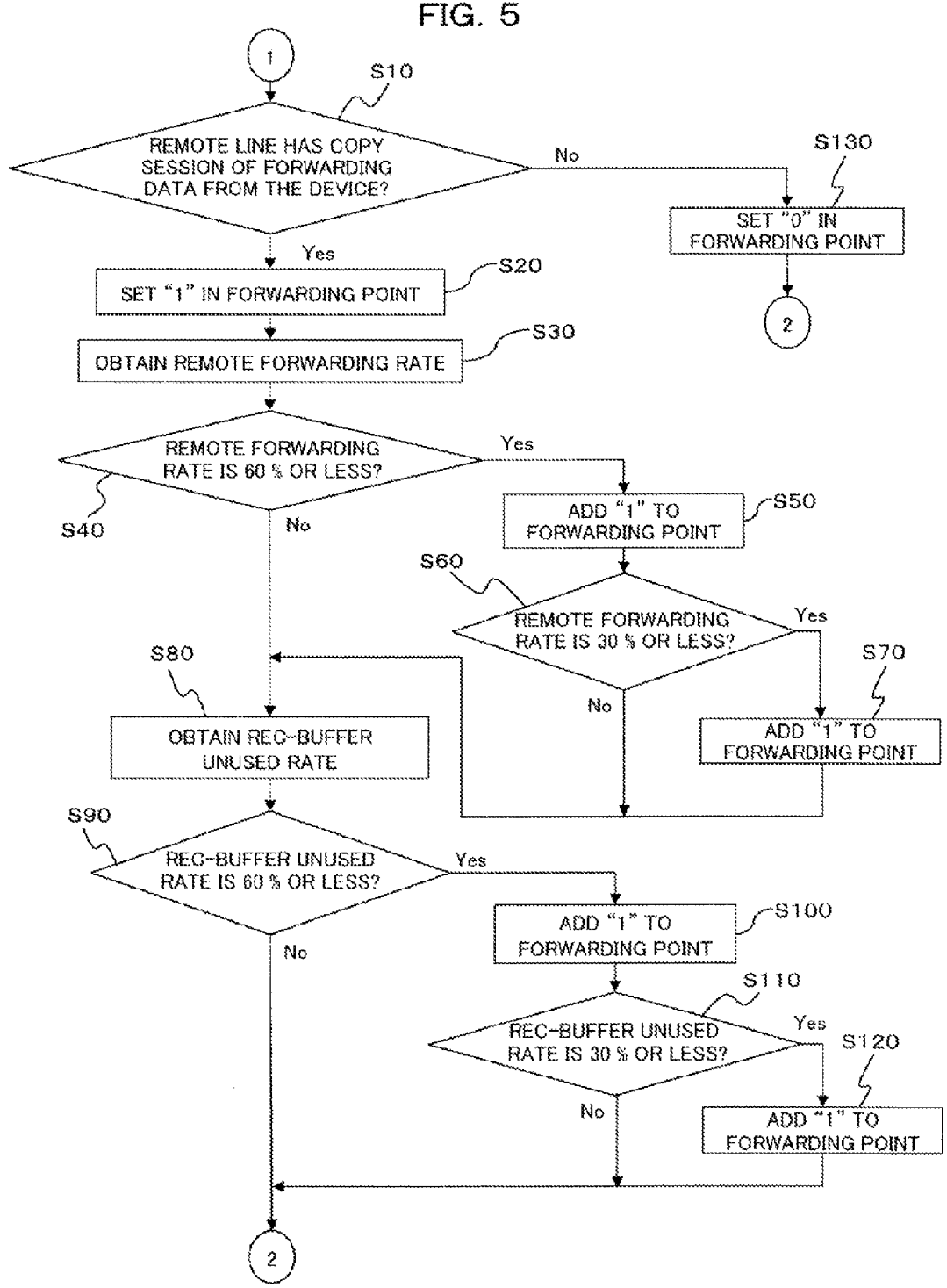
Figure 6:
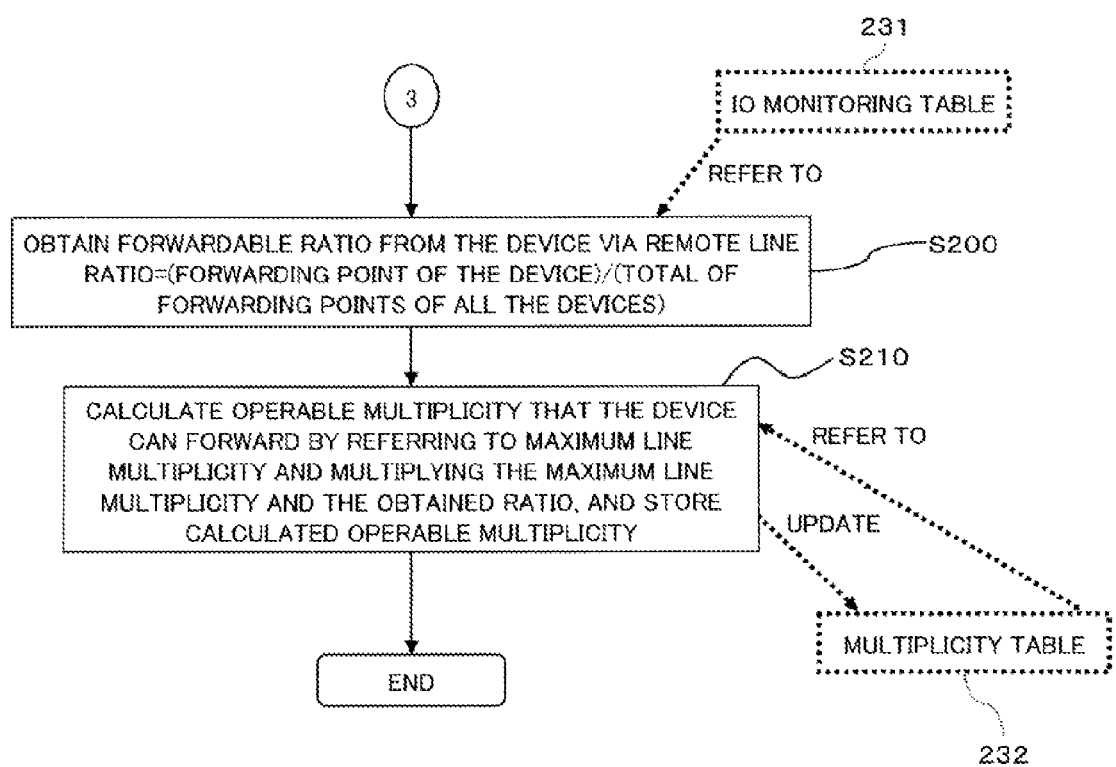

First of all, the forwarding point calculator 11 refers to the session data and confirms whether the object remote line 50 has a copy session in which the device 10 is to serve as a source storage device 10 in step S10 of FIG. 5.

If a copy session in which the device 10 is to serve as a source storage device 10 is present (Yes route in step S10), the forwarding point calculator 11 sets "1" in the forwarding point (step S20).

The forwarding point calculator 11 calculates the remote forwarding rate using above expression (1) (step S30), and determines whether the calculated remote forwarding rate is the first threshold (60%) or lower (step S40).

If the calculated remote forwarding rate is not the first threshold (60%) or lower (No route in step S40), the forwarding point calculator 11 calculates the REC-buffer unused rate using above expression (2) (step S80).

On the other hand, if the calculated remote forwarding rate is the first threshold (60%) or lower (Yes route in step S40), the forwarding point calculator 11 adds "1" to the forwarding point (step S50) and further determines whether the calculated remote forwarding rate is the second threshold (30%) or lower (step S60).

If the calculated remote forwarding rate is not the second threshold (30%) or lower (No route in step S60), the procedure moves to step S80. Conversely, if the calculated remote forwarding rate is the second threshold (30%) or lower (Yes route in step S60), the forwarding point calculator 11 adds "1" to the forwarding point (step S70), and then moves to step S80.

Next, the forwarding point calculator 11 determines whether the calculated REC-buffer unused rate is the first threshold (60%) or less (step S90).

If the calculated REC-buffer unused rate is not the first threshold (60%) or less (No route in step S90), the forwarding point calculator 11 stores the calculated forwarding point of the device 10 itself into the IO monitoring table 231 (step S140) as denoted in FIG. 4.

Conversely, if the calculated REC-buffer unused rate is the first threshold (60%) or less (Yes route in step S90), the forwarding point calculator 11 adds "1" to the forwarding point (step S100), and further determines whether the calculated REC-buffer unused rate is the second threshold (30%) or less (step S110).

If the calculated REC-buffer unused rate is the second threshold (30%) or less (No route in step S110), the procedure moves to step S140. Conversely, if the calculated REC-buffer unused rate is the second threshold (30%) or less (Yes route in step S110), the forwarding point calculator 11 adds "1" into the forwarding point (step S120) and moves to step S140.

If a copy session in which the device 10 is to serve as a source storage device 10 is not present (No route in step S10), the forwarding point calculator 11 sets "0" in the forwarding point (step S130), and then moves to step S140.

After that, the forwarding point exchanger 12 checks a storage device 10 connected to the object remote line 50 with reference to the system configuration data stored in the RAM 23 (step S150).

The forwarding point exchanger 12 confirms the presence of a storage device 10 which is connected to the object remote line 50 and from which the forwarding point is not obtained (step S160). If a storage device 10 which is connected to the remote line 50 and from which the forwarding point is not obtained is present (Yes route in step S160), the forwarding point exchanger 12 exchanges the forwarding points with the storage device 10 from which the forwarding point is not obtained yet (step S170).

Namely, the forwarding point exchanger 12 sends a request for sending a forwarding point along with the forwarding point of the device 10 itself calculated by the forwarding point calculator 11 therein to the other storage device 10 through remote communication. Upon receipt of the request, the other storage device 10 stores the forwarding point calculated by a procedure the same as the above steps S10 through S130 into response data and replies with the response data through remote communication (step S180).

The forwarding point exchanger 12 stores the forwarding point obtained from the other storage device 10 into the IO monitoring table 231 (step S190), and then returns to step S160.

If the device 10 obtains the forwarding points from all the other storage devices 10 connected to the object remote line 50 and therefore a storage device 10 from which a forwarding point is not obtained is not present (No route in step S160), the multiplicity calculator 13 calculates the ratio of multiplicity that the storage device 10 may occupy to the maximum line multiplicity set for the object remote line 50 using above expression (3) (step S200) as depicted in FIG. 6.

Then the multiplicity calculator 13 calculates an operable multiplicity allocated to the device 10 by multiplying the maximum line multiplicity set for the object remote line 50 by the ratio calculated in step S200. The multiplicity calculator 13 stores the calculated operable multiplicity into the multiplicity table 232 (step S210), and finishes the procedure.

Figure 7:
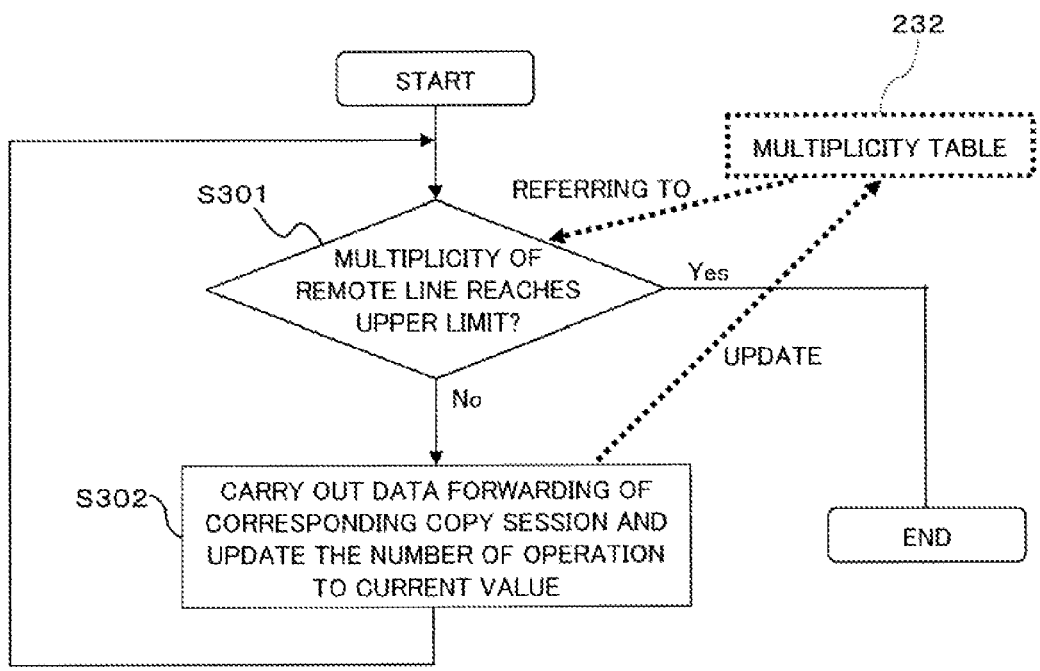
FIG. 7 is a flow diagram denoting a succession of procedural steps of data forwarding scheduling in a storage system of the first embodiment.

Next, data forwarding scheduling in the storage system 1 of the first embodiment will now be described with reference to the flow diagram (steps S301 and S302) of FIG. 7.

In the event of data forwarding of a copy session, the forwarding controller 14 compares the number of operations and the operable multiplicity with reference to the multiplicity table 232, and determines whether the number of operations on the remote line 50 reaches the operable multiplicity (step S301). If the number of operations on the remote line 50 does not reach the operable multiplicity (No route in step S301), the forwarding controller 14 carries out data forwarding of the copy session (step S302), and also updates the number of operations stored in the multiplicity table 232. Namely, the forwarding controller 14 increases the number of operations in the multiplicity table 232 each time a data forwarding process starts (increment); and decreases the number of operations in the multiplicity table 232 (decrement) each time a data forwarding process finishes. After that, the procedure returns to step S301.

Conversely, if the number of operations on the remote line 50 reaches the operable multiplicity (Yes route in step S301), the forwarding controller 14 finishes the procedure without carrying out data forwarding of the copy session.

Figures 9A, 9B:
FIG. 9A is a diagram depicting an example of an IO monitoring table.
FIG. 9B is an example of a diagram depicting a multiplicity table.

Hereinafter, description will now be made in relation to an example of a method for controlling data forwarding in the storage system 1 of the first embodiment. FIGS. 8A and 8B are diagrams illustrating change in a data forwarding state in the storage system 1 of the first embodiment, in which four storage devices 10-1 through 10-4 are connected to a single remote line 50: FIG. 8A depicts the initial state; and FIG. 8B depicts a state set to be an optimum data forwarding state. FIG. 9A depicts the monitoring table 231 of the storage device 10-1; and FIG. 9B depicts the multiplicity table 232 of the storage device 10-1. FIG. 10A depicts the IO monitoring table 231 of the storage device 10-2; and FIG. 10B depicts the multiplicity table 232 of the storage device 10-2. FIG. 11A depicts the IO monitoring table 231 of the storage device 10-3; and FIG. 11B depicts the multiplicity table 232 of the storage device 10-3. FIG. 12A depicts the IO monitoring table 231 of the storage device 10-4; and FIG. 12B depicts the multiplicity table 232 of the storage device 10-4.

As depicted in FIG. 8A, the storage devices 10-1 through 10-4 are connected to the remote line 50-1 (hereinafter sometimes called remote line A) having the maximum line multiplicity of 16. The IDs of the storage devices 10-1, 10-2, 10-3, and 10-4 are assumed to be #00, #01, #02, and #03, respectively, and the remote line ID of the remote line 50-1 is assumed to be 0x00.

The initial state is set such that the storage device 10-3 carries out data forwarding to the storage devices 10-1 and 10-2 both at a multiplicity of 8, and also that the storage device 10-4 carries out data forwarding to the storage device 10-1 at a multiplicity of 16. This means that the multiplicity of 32 in total is set in the remote line 50-1, which has the maximum line multiplicity of 16, and therefore this initial state does not set the optimum forwarding multiplicity for the remote line 50-1.

After a predetermined time from the initial state, the storage device 10-3 has a remote forwarding rate of 80% and an REC-buffer unused rate of 80% for the remote line 50-1; and the storage device 10-4 has a remote forwarding rate of 20% and an REC-buffer unused rate of 70% for the remote line 50-1.

As illustrated in FIGS. 9A, 10A, 11A and 12A, the storage devices 10-1, 10-2, 10-3, and 10-4 after the predetermined time have forwarding points of 0, 0, 1, and 3, respectively.

Hereinafter the term "self value" represents the forwarding paints calculated in the device 10 in the drawings.

As illustrated in FIGS. 11A and 11B for example, the operable multiplicity of the source storage device 10-3 may be obtained as follows using above expressions (3) and (4).

$$\text{operable multiplicity} = 16 \times \{1/(0+0+1+3)\}$$
$$= 4$$

Similarly, as illustrated in FIGS. 12A and 12B, the operable multiplicity of the source storage device 10-4 may be obtained as follows using above expressions (3) and (4).

$$\text{operable multiplicity} = 16 \times \{3/(0+0+1+3)\}$$
$$= 12$$

As a result, as illustrated in FIG. 8B, the storage device 10-4 carries out data forwarding to the storage device 10-1 at a multiplicity of 12; and the storage device 10-3 equally distributes the calculated operable multiplicity "4" to data forwarding to the storage device 10-1 and that to the storage device 10-2, that is, the storage device 10-3 carries out data forwarding to each storage device at the operable multiplicity (multiplicity) of "2". The storage device 10-3 carries out data forwarding to the storage device 10-1 at a multiplicity of "2" and also to the storage device 10-2 at a multiplicity of "2".

The forwarding controller 14 carries out data forwarding to one or more destination storage devices 10 in parallel (i.e., multiplexly) within the operable multiplicity obtained in the above described manner.

Accordingly, the method of controlling data forwarding in the storage system 1 allows the data forwarding from the source storage devices 10-3 and 10-4 without exceeding the maximum line multiplicity of 16 set for the remote line 50-1.

At that time, a storage device 10 having a higher forwarding point, that is, a storage device 10 in a poorer state of data forwarding processing is allocated a higher multiplicity than that allocated to a storage device 10 having a lower forwarding point. Thereby, data forwarding of a storage device 10 in a poorer state of data forwarding processing is preferentially treated, so that the processing efficiency of data forwarding of the entire system may be improved.

As illustrated in FIGS. 11B and 12B, the number of operations in each of the storage devices 10-3 and 10-4 occasionally changes and therefore is described "variable" in the drawings.

Figure 17A:
FIG. 17A is a diagram depicting an example of an IO monitoring table.
Figure 17B:
FIG. 17B is an example of a diagram depicting a multiplicity table.
Figure 18:
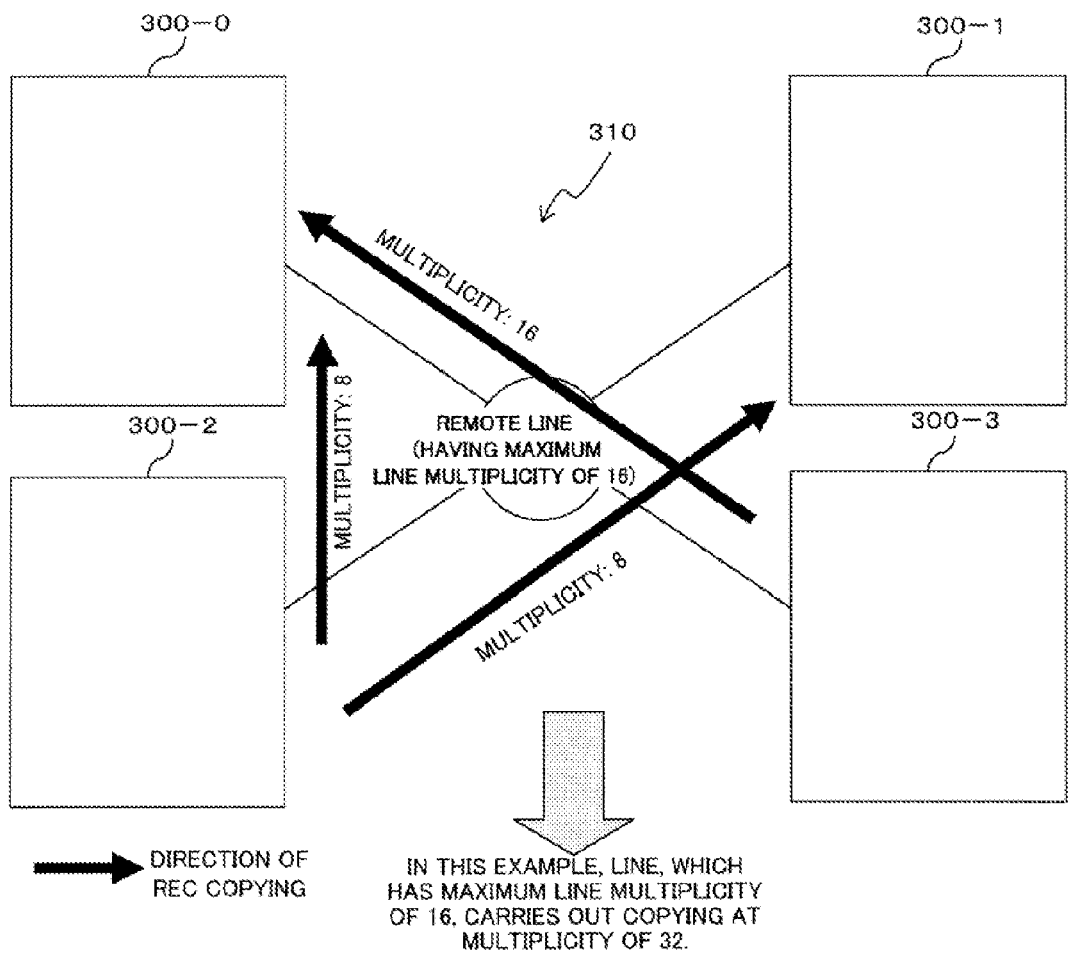
FIG. 18 is a diagram denoting remote copying in a conventional storage system.

Furthermore, a method of controlling data forwarding in the storage system 1 of the first embodiment will now be described. FIGS. 13A and 13B are diagrams illustrating change in a data forwarding state in a storage system 1 of the first embodiment in which four storage devices 10-1 through 10-4 are connected to two remote lines 50: FIG. 13A illustrating the initial state; and FIG. 13B illustrating a state set to be an optimum data forwarding state. FIG. 14A is a diagram depicting the IO monitoring table 231 of the storage device 10-1; and FIG. 14B is a diagram depicting the multiplicity table 232 of the storage device 10-1. FIG. 15A is a diagram depicting the IO monitoring table 231 of the storage device 10-2; and FIG. 15B is a diagram depicting the multiplicity table 232 of the storage device 10-2. FIG. 16A is a diagram depicting the IO monitoring table 231 of the storage device 10-3; and FIG. 15B is a diagram depicting the multiplicity table 232 of the storage device 10-3. FIG. 17A is a diagram depicting the IO monitoring table 231 of the storage device 10-4; and FIG. 17B is a diagram depicting the multiplicity table 232 of the storage device 10-4.

As illustrated in FIG. 13A, the storage devices 10-1 through 10-4 are connected to the remote line 50-2 (sometimes called the remote line B), which has the maximum line multiplicity of 18; and the storage devices 10-1 and 10-2 are connected to the remote line 50-1 (sometimes called the remote line A), which has the maximum line multiplicity of 32. The IDs of the storage devices 10-1, 10-2, 10-3, and 10-4 are assumed to be #00, #01, #02, and #03 respectively.

The initial state is set such that: storage device 10-1 carries out data forwarding to the storage device 10-2 via the remote line 50-2 at s multiplicity of 18 and also via the remote line 50-1 at a multiplicity of 32; the storage device 10-3 carries out data forwarding to the storage device 10-2 via the remote line 50-2 at a multiplicity of 18; and the storage device 10-4 carries out data forwarding to the storage device 10-1 via the remote line 50-2 at a multiplicity of 18.

This means that the multiplicity of 54 in total is set in the remote line 50-1, which has the maximum line multiplicity of 18, and therefore an optimum forwarding multiplicity is not set for the remote line 50-1.

The remote line IDs of the remote lines 50-1 and 50-2 are assumed to be 0x00 and 0x01, respectively.

After a predetermined time from the initial state, the source storage device 10-1 is assumed to have a remote forwarding rate of 80% and an REC-buffer unused rate of 90% for the remote line 50-1; and have a remote forwarding rate of 80% and an REC-buffer unused rate of 80% for the remote line 50-2. Concurrently, the source storage device 10-3 is assumed to have a remote forwarding rate of 50% and an REC-buffer unused rate of 40%; and the source storage device 10-4 is assumed to have a remote forwarding rate of 10% and an REC-buffer unused rate of 10%.

As illustrated in FIGS. 14A, 15A, 16A, and 17A, the storage devices 10-1, 10-2, 10-3, and 10-4 after the predetermined time have forwarding points of 1, 0, 0, and 0, respectively, for the remote line 50-1 (having the remote line ID: 0x00); and have forwarding points of 1, 0, 3, and 5, respectively, for the remote line 50-2 (having the remote line ID: 0x01).

As illustrated in FIGS. 14A and 14B for example, the operable multiplicity of the source storage device 10-1 for the remote line 50-1 (having the remote line ID 0x00) may be obtained as follows using above expressions (3) and (4).

$$\text{operable multiplicity} = 32 \times \{1/(1+0+0+0)\}$$
$$= 32$$

The operable multiplicity of the source storage device 10-1 for the remote line 50-2 (having the remote line ID: 0x01) may be obtained as follows using above expressions (3) and (4).

$$\text{operable multiplicity} = 18 \times \{1/(1+0+3+5)\}$$
$$= 2$$

As illustrated in FIGS. 16A and 16B, the operable multiplicity of the source storage device 10-3 for the remote line 50-2 (having the remote line ID 0x01) may be obtained as follows using above expressions (3) and (4).

$$\text{operable multiplicity} = 18 \times \{3/(1+0+3+5)\}$$
$$= 6$$

Furthermore, as illustrated in FIGS. 17A and 17B for example, the operable multiplicity of the source storage device 10-4 for the remote line 50-2 (having the remote line ID 0x01) may be obtained as follows using above expressions (3) and (4).

$$\text{operable multiplicity} = 18 \times \{5/(1+0+3+5)\}$$
$$= 10$$

Consequently, as illustrated in FIG. 13B, the storage device 10-4 carries out data forwarding to the storage device 10-1 at a multiplicity of 10; the storage device 10-3 carries out data forwarding to the storage device 10-2 at a multiplicity of 6; the storage device 10-1 carries out data forwarding to the storage device 10-2 via the remote line 50-1 at a multiplicity of 32 and via the remote line 50-2 at a multiplicity of 2.

The forwarding controller 14 carries out data forwarding to one or more destination storage devices 10 in parallel (i.e., multiplexly) within the operable multiplicity obtained in the above described manner.

Accordingly, the method of controlling data forwarding in the storage system 1 allows the data forwarding from the source storage devices 10-1, 10-3, and 10-4 without exceeding the maximum line multiplicities of 32 and 18 respectively set for the remote lines 50-1 and 50-2.

At that time, a storage device 10 having a higher forwarding point, that is, a storage device 10 in a poorer state of data forwarding processing is allocated a higher multiplicity than that allocated to a storage device 10 having a lower forwarding point. Thereby, data forwarding of a storage device 10 in a poorer state of data forwarding processing is preferentially treated, so that the processing efficiency of data forwarding of the entire system may be improved.

As the above, the storage system 1 of the first embodiment causes each of the storage devices 10 sharing a remote line 50 to calculate a forwarding point representing a state of data forwarding of the device 10 itself.

Exchanging the calculated forwarding points with the remaining storage devices 10, each storage device 10 sharing the remote line 50 may grasp the state of data forwarding the storage device 10 itself and the remaining storage devices 10.

The multiplicity calculator 13 obtains the operable multiplicity of the device 10 itself by multiplying the maximum line multiplicity set for a remote line 50 and a ratio of the forwarding point of the device 10 to the total forwarding point of all the storage devices 10 sharing the remote line 50.

Thereby, data forwarding under the REC function may be carried out among multiple storage devices 10 that share a remote line 50 so as not exceed the maximum line multiplicity set for the remote line 50. In other words, copying may be efficiently scheduled at a suitable forwarding multiplicity for each remote line 50, and the system may operate stably.

In setting an operable multiplicity by the multiplicity calculator 13, a storage device 10 having a higher forwarding point, that is, a storage device 10 in a poorer state of data forwarding processing is allocated a higher multiplicity than that allocated to a storage device 10 having a lower forwarding point. Thereby, data forwarding of a storage device 10 in a poorer state of data forwarding processing is preferentially treated, so that the processing efficiency of data forwarding of the entire system may be improved.

The above first embodiment may be variously modified without departing from the concept of the present invention.

For example, the above first embodiment assumes that the RA 25 is a fibre channel adaptor, but is not limited to this. Various alternatives to RA 25 may be suggested. For example, the RA 25 may be an iSCSI-RA conforming to the iSCSI. In this case, the storage device 10 may be connected to a remote line 50 without the FCIP converter 51.

In the first embodiment, a low forwarding point represents a good state of data forwarding processing in a storage device 10; and conversely a high forwarding point represents a poor state of data forwarding processing in a storage device 10. However, the relationship of a forwarding point and a state of data forwarding processing is not limited to this. Alternatively, a low forwarding point may represent a good state of data forwarding processing in a storage device 10; and conversely a high forwarding point may represent a poor state of data forwarding processing in a storage device 10, and another example may be suggested.

In the first embodiment, the forwarding point calculator 11 calculates a forwarding point by comparing each of a remote forwarding rate and an REC-buffer unused rate with two thresholds, that is the first threshold (60%) and the second threshold (30%). However, calculation of a forwarding point is not limited to the above and may be variously changed. For example, the first threshold may be a value except for 60%, and the second threshold may be a value except for 30%. The thresholds of a remote forwarding rate may be different from those of an REC-buffer unused rate, and the number of thresholds of a remote forwarding rate may be different from that of an REC-buffer unused rate. Furthermore, each of a remote forwarding rage and an REC-buffer unused rate may be compared with one threshold or three or more threshold.

In calculation of a forwarding point, a value to be added to the forwarding point may be different with a remote forwarding rate or an REC-buffer unused rate. Further alternatively, a forwarding point may be obtained on the basis of a remote forwarding rate or an REC-buffer unused rate using a conversion table or a conversion expression instead of comparison with the thresholds.

Those ordinarily skilled in the art may carry out the first embodiment when referring to the above disclosure.

According to the technique disclosed herein, data forwarding may be efficiently accomplished at a multiplicity suitable for a communication line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A storage device connectable to another storage device via one or more communication lines, the storage device comprising:
   a point value calculator that calculates a first-point value representing whether a transfer state of data forwarded from the storage device via the communication lines is good;
   a notifier that notifies the first point value to the another storage device;
   a receiver that receives a second point value representing whether a transfer state of data forwarded from the another storage device via the communication lines are good, the second point value being calculated by the point value calculator included in the another storage device;
   a multiplicity calculator that calculates, using the first point value and the second point value, a multiplicity representing number of data transfer processes which the storage device is able to simultaneously carry out on the communication lines; and
   a forwarding controller that forwards data via the communication lines within the calculated multiplicity, wherein
   the multiplicity calculator calculates a rate of the first point value to the sum of the first point value and the second point value, and calculates the multiplicity by multiplying a maximum multiplicity set for the communication lines and the calculated rate.

2. The storage device according to claim 1, wherein the point value calculator calculates the first point value based on a ratio of a forwarding data amount of data forwarded from the storage device to the communication lines within a predetermined time period to a writing data amount of data sent from a superior device to the storage device within the predetermined time period.

3. The storage device according to claim 1, wherein the point value calculator calculates the first point value based on a usage rate of a forwarding data buffer included in the storage device.

4. A method for forwarding data from a first storage device to a second storage device in a storage system comprising a plurality of storage devices, including the first storage device and the second storage device and being connected via one or more communication lines, the method comprising:
   calculating, by a first processor, a first point value representing whether a transfer state of data forwarded from the first storage device via the communication lines is good;
   notifying the first point value to the second storage devices in the storage system;
   receiving second point values representing whether transfer states of data forwarded from the second storing devices are good, the second point value being calculated by a second processor in the second storing devices;
   calculating, by the first processor, using the first point value and the second point values, a multiplicity representing number of data transfer processes that the first storage device is able to simultaneously carry out on the communication lines;
   forwarding data via the communication lines within the calculated multiplicity; and calculating, by the first processor, a rate of the first point value to the sum of the first point value and the second point value, wherein the multiplicity is calculated by multiplying a maximum multiplicity set for the communication lines and the calculated rate.

5. The method according to claim 4, wherein the first point value is calculated on the basis of a ratio of a forwarding data amount of data forwarded from the first storage device to the communication lines within a predetermined time period to a writing data amount of data sent from a superior device to the first storage device within the predetermined time period.

6. The method according to claim 4, wherein the first point value is calculated on the basis of a usage rate of a forwarding data buffer included in the first storage device.

7. A computer-readable recording medium having stored therein a program for causing an information processor, being connected to a second information processor via one or more communication lines, to execute a process of forwarding data to the second information processor, the process comprising:
calculating a first point value representing whether a transfer state of data forwarded from the information processor via the communication lines is good;
notifying the first point value to the second information processor;
receiving a second point value representing whether a transfer state of data forwarded from the second information processor is good, the second point value being calculated in the second information processor;
calculating, using the first point value and the second point value, a multiplicity representing number of data transfer processes that the information processor is able to simultaneously carry out on the communication lines;
forwarding data via the communication lines within the calculated multiplicity
and
calculating a rate of the first point value to the sum of the first point value and the second point value,
wherein the multiplicity is calculated by multiplying a maximum multiplicity set for the communication lines and calculated rate.

8. The computer-readable recording medium according to claim 7, wherein the first point value is calculated on the basis of a ratio of a forwarding data amount of data forwarded from the information processor to the communication lines within a predetermined time period to a writing data amount of data sent from a superior device to the information processor within the predetermined time period.

9. The computer-readable recording medium according to claim 7, wherein the first point value is calculated on the basis of a usage rate of a forwarding data buffer included in the information processor.

* * * * *